No. 645,827. Patented Mar. 20, 1900.
W. H. ONION.
DUMPING CAR.
(Application filed Aug. 23, 1899.)
(No Model.) 2 Sheets—Sheet 1.
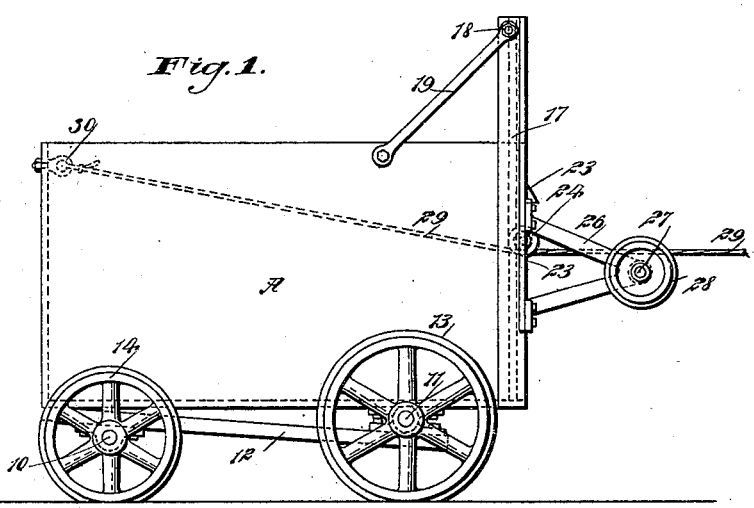
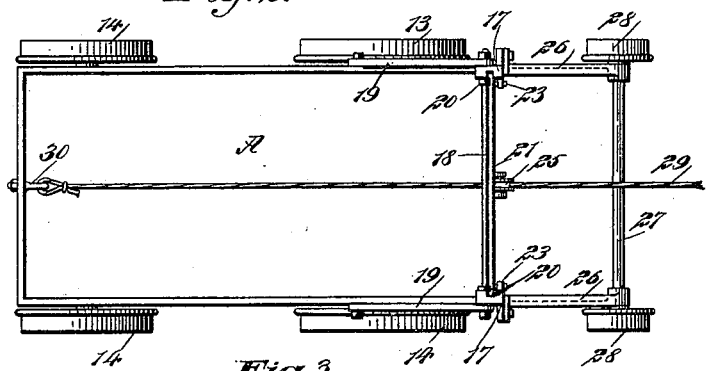
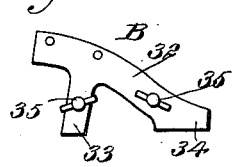
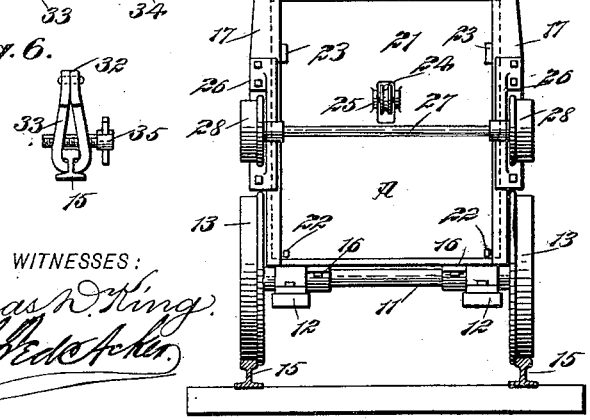
WITNESSES: INVENTOR
W. H. Onion
BY
ATTORNEYS

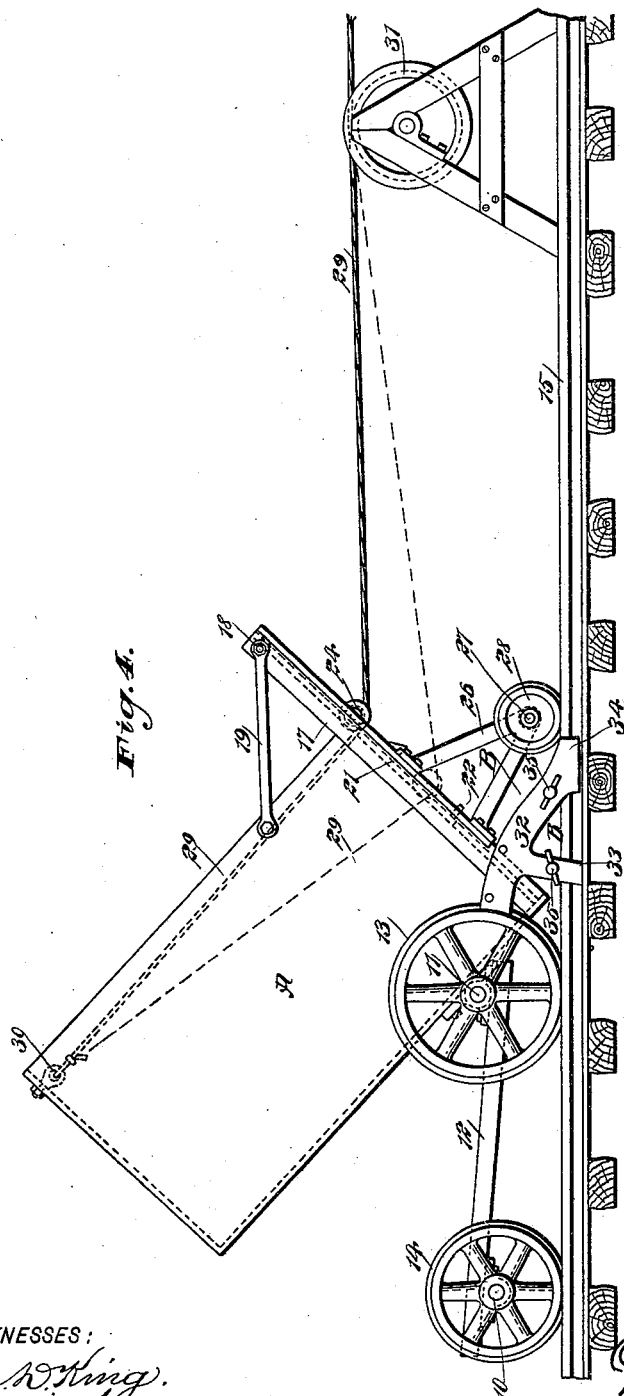

UNITED STATES PATENT OFFICE.

WILLIAM HOWELL ONION, OF NEW ORLEANS, LOUISIANA.

DUMPING-CAR.

SPECIFICATION forming part of Letters Patent No. 645,827, dated March 20, 1900.

Application filed August 23, 1899. Serial No. 728,198. (No model.)

*To all whom it may concern:*

Be it known that I, WILLIAM HOWELL ONION, of New Orleans, in the parish of Orleans and State of Louisiana, have invented a new and useful Improvement in Dumping-Cars, of which the following is a full, clear, and exact description.

One object of my invention is to construct a dumping-car which in operation does not require extra track-sections or alterations in a bridge or track upon which it is to be used.

Another object of the invention is to provide a stop or bumper capable of convenient and expeditious application to a rail at any point in its length, and to so construct the car that upon striking said stop it will be automatically dropped to dumping position and a section of the body operated to discharge the load, and also to provide a means for varying the inclination of the car-body when the load is to be dumped and supporting a car at its discharge end while dumping.

A further object of the invention is to provide means for controlling the movements of the car by a cable and directly utilizing the cable for raising a section of the car-body and causing the cable, in connection with the stop or bumper, to incline the car-body suitably for dumping purposes.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved car. Fig. 2 is a plan view thereof. Fig. 3 is a front elevation of the car. Fig. 4 is a side elevation of the car in dumping position. Fig. 5 is a side elevation of a stop or bumper used in connection with the car, and Fig. 6 is an end view of the stop or bumper shown in Fig. 5.

The running-gear of the car consists of a rear axle 10, a forward axle 11, that is farther removed from the ground than the rear axle 10, connecting-bars 12, that are secured upon the upper surface of the rear axle 10 and to the under surface of the forward axle 11, flanged wheels 13, mounted to turn on said forward axle 11, and smaller corresponding wheels 14, mounted to turn upon the rear axle 10.

The body A of the car may be made of any suitable material and may be given any desired shape. Ordinarily it is rectangular, as shown, and when the body is in carrying position it rests practically on the forward axle 11 and upon the rear ends of the connecting beams or bars 12, as shown in Fig. 1; but the body A is pivotally connected with the forward axle by means of straps 16 or their equivalents, as shown in Fig. 3. The wheels 13 and 14 are adapted to travel upon the rails 15 of an ordinary track.

Uprights 17 are secured to the front of the body, one at each side, and these uprights extend from the bottom of the body, above the top thereof, as is particularly shown in Fig. 3. The uprights are connected at the top by a suitable cross-bar 18 and are sustained at their upper ends by braces 19, attached to the outer faces of the uprights and to the outer side surfaces of the body A. Each upright 17 is provided with a longitudinal slideway 20 in its inner face, and the side edges of a door 21 enter said slideways, and said ways serve as guides for the door, the door being a dumping-door and adapted to have vertical sliding movement. The upward movement of the door 21 is limited by forming lugs 22 on the front face of the door at the bottom, which lugs 22, when the door is fully elevated, are brought in engagement with lugs 23, attached to the inner surfaces of said uprights 17. The door 21 is provided with an opening 24 about centrally between its sides and preferably nearer the top than the bottom, and at this opening a grooved pulley 25 is journaled in suitable bearings. Hangers 26 are secured to the outer face of the uprights 17, and these hangers are horizontal when the body is in carrying position. The hangers are adjustably attached to said uprights. A shaft 27 is journaled in said hangers 26, and this shaft is provided at each outer end with a small flanged wheel 28, the wheels 28 being adapted for engagement with the rails of the track upon which the car is to travel. The wheels and hangers 26 are adapted to control the degree of inclination of the body A when the load is to be dumped, since at that time the wheels 28 will engage with the track, as shown in Fig. 4. Therefore the hangers 26 are made adjustable, so that a greater or less dumping inclination may be imparted to the body.

When the track is inclined downward in direction of the loading-ground, a single cable 29 is passed under the pulley 25, carried by the door, and is attached by an eye 30, or its equivalent, to the upper central portion of the back of the car-body, and the said cable is carried to an engagement with a drum 31, situated somewhat adjacent to the place where the load is to be dumped, as shown in Fig. 4; but if the track is level two cables will be used, the cable 29 to draw the loaded car to the dumping-ground, and a second cable, which may be attached to the back of the car, to return said car to the loading-ground.

Two bumpers or stops B are employed in connection with the car. Each of these bumpers or stops consists of an inclined body 32, adapted to be located over a rail of a track, a clamp 33, which extends downward from the body near its higher end, the jaws of the clamp being adapted to engage with a rail, as shown in Fig. 6, and a second clamp 34, of similar construction to the clamp 33, which clamp 34 forms the under portion of the lower part of the stop or bumper. Both clamps are provided with suitable adjusting-screws 35.

In operation the bumpers or stops are secured upon the rails 15 of the track at or near the point where the load is to be dumped, the higher ends of the bumpers or stops facing the car. After the car is loaded it is drawn to the dumping-ground by winding up the cable 29, and when the car reaches the dumping-ground the front wheels will engage with the bumpers or stops B. The cable is then still further wound, thus drawing the front of the car downward until the guide-wheels 28 engage with the track, and by continuing to wind upon the cable 29 said cable by reason of its engagement with the pulley 25 will cause the door 21 to slide upward, and consequently the load will be dumped. When the load is dumped, the cable is slackened, and if the track be inclined the car in descending the incline will cause its guide-wheels 28 to travel up the inclined surfaces of the stops or bumpers B, thus insuring the body of the car being restored to its normal position, and as the cable 29 is slackened the door 21 automatically closes.

Having thus described my invention, I claim as new and desire to secure by Letters Patent—

1. In a dumping-car, a running-gear, a dumping-body mounted to tilt on the front end of said gear, a cable secured to the rear and free end of said body, stops adapted to engage with the car, and guide-wheels at the dumping end of the body, said wheels being adapted to limit the inclination of the body and restore the body to a carrying position after having been dumped.

2. A dumping-body provided with a sliding door in its dumping end, and a draft device secured to said body and connected with the door whereby to slide the latter, as set forth.

3. A dumping-body, a dumping-door for the body, a draft device connected with the body, said draft device serving also to operate the door and assist in inclining the body, and means for limiting the inclination of said body.

4. In a car, a dumping-body, a dumping-door, a stop for the supporting-wheels of the car, a draft-cable attached to the body and controlling the movement of the door, and guide-wheels at the dumping end of the body, arranged to limit the inclination of said body and restore the body to a carrying position after having been dumped.

5. In a car, the combination, with the running-gear, a body pivotally attached to the running-gear, a sliding door for said body, a roller carried by said door, and a draft-cable passed to an engagement with the said roller, and secured to the inner portion of said body, of stops or bumpers adapted for clamping engagement with the rails of a track and adapted for engagement with the wheels of the car, said stops or bumpers having inclined upper track-surfaces, and guide-wheels carried at the dumping end of the body, said guide-wheels being arranged for engagement with the rails of the track to limit the inclination of the body, said wheels being likewise adapted to travel upon the track-surfaces of the stops or bumpers and thus direct the body to dumping position.

6. In a dumping-car, a tilting dumping-body having a sliding door at its discharge end and a cable secured to said body for tilting the same, said cable being passed through the door, as and for the purpose set forth.

7. In a dumping-car, a tilting dumping-body having uprights at its discharge end, a door fitted to slide in said uprights and having a roller journaled therein, means for limiting the upward movement of said door, a cable secured to the dumping-body and passed under said roller, hangers extending out from the discharge end of the body, and guide-wheels carried at the outer end of said hangers, as and for the purpose set forth.

WILLIAM HOWELL ONION.

Witnesses:
W. L. HAMLET,
JOHN M. ONION, Jr.